Dec. 3, 1957  H. FLECKENSTEIN  2,815,459
SHORT-CIRCUIT WINDING FOR SPLIT-POLE MOTORS
Filed Aug. 19, 1955
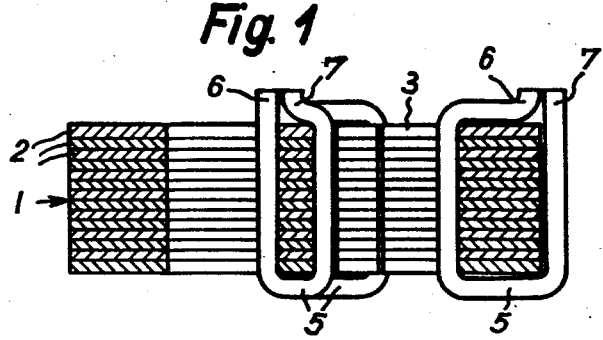
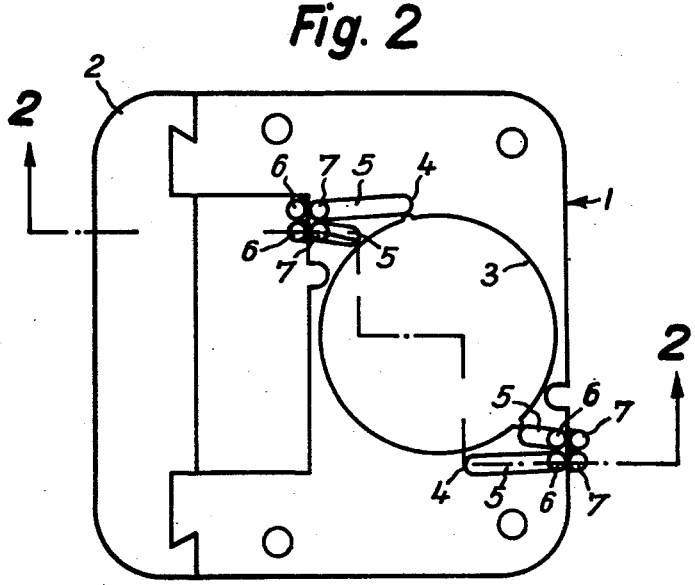
Hans Fleckenstein
Inventor:
By Pierce, Scheffler & Parker
Attorneys

United States Patent Office 2,815,459
Patented Dec. 3, 1957.

2,815,459

SHORT-CIRCUIT WINDING FOR SPLIT-POLE MOTORS

Hans Fleckenstein, Oldenburg, Germany, assignor to Licentia Patent-Verwaltungs-G. m. b. H., Hamburg, Germany Application August 19, 1955, Serial No. 529,463

Claims priority, application Germany August 19, 1954

5 Claims. (Cl. 310—172)

The present invention relates to electric motors and in particular to motors of the split-pole type, and wherein an improved technique is herein disclosed and claimed for constructing and applying the short-circuit winding to the laminated stator of the motor.

In motors of the type involved it is possible only in rare cases, and then only with motors having a cylindrical construction, to shape the poles in such manner that the short-circuit winding can be applied as a completed unit. In most situations, and always in the case of the two-pole flat construction, in which the rotor space represents a closed cylinder in order to avoid the necessity for the use of special plates to make it possible for the stray, i. e. leakage flux to pass from one pole to the other, the short-circuit windings must be pushed onto the stator in the form of open stirrups or yokes; the ends are then bent into a ring and closed. Heretofore, closing of the ends was done by hard-soldering them together. That method not only requires considerable time but involves the additional drawback that heating of the joint cannot be kept localized which results in tarnishing and sometimes also warping of the stator plates or laminations. Moreover, the transition resistance at the soldered joints cannot be maintained uniform with any degree of certainty with the result that there is considerable variance between ostensibly identical motors as to their performance, e. g. in their speed.

In order to eliminate some of these drawbacks it has been already suggested that the short-circuit winding be formed in situ on the stator by utilization of the metal-spray technique. With the metal-spray technique, however, the problem of variance between individual motors as to performance characteristics is not solved, for in place of the variable transition resistance factor which characterized soldered joints there now came a more or less intimate connection of the spray-cast winding with the laminated stator element; also the density of the metal used for spray casting was also changeable, and with it the electrical resistance of the winding.

The present invention presents an improved technique for forming the short-circuit winding in place on the stator element of the motor and which suffers from none of the drawbacks of the prior practice. In particular, according to the present invention the end portions of the short-circuit windings are so formed and bent that they run parallel in close proximity and, preferably, touch each other. Moreover, the front surfaces of the ends lie next to each other approximately in the same plane, so that such ends can then be welded together by conventional welding techniques. If the short-circuit windings are formed from round wire, then the end portions are advantageously fused down according to the procedure utilized in carbon arc welding, since the fewest contrivances are needed for this. If the short-circuit winding is made of wire having a rectangular cross-section, the welding of the end portions can also be accomplished by the resistance-fusion welding technique between two obliquely placed carbon electrodes which offers the advantage of using alternating current. In the event that the short-circuit winding has considerable cross-sectional area the ends thereof may be united electrically by the pressure-butt welding technique. With this method of welding the two end portions of the winding are first pressed together under great pressure to assure perfect current passage between them before the current is turned on.

If the cross-sectional area of the short-circuit winding is so great as to render impractical, bending of the same to bring the ends into position for welding, the winding can be formed in two parts and these parts welded together at their end portions.

Fashioning of the end portions of the short-circuit winding in accordance with the invention so as to enable such end portions to be welded therefore leads to considerable savings in time as compared with the soldering technique of the prior art, and also, because of the uniform resistance characteristic of the short-circuit windings which is thus assured, and the non-integral mounting of the winding on the stator, makes it possible to manufacture motors having substantially identical performance characteristics such as speed, etc.

In the accompanying drawing which illustrates one embodiment of the invention

Fig. 1 is a view in vertical transverse section of a motor stator of the so-called flat construction having two pairs of short-circuit windings thereon, the view being taken on line 2—2 of Fig. 2; and Fig. 2 is a plan view of the stator and windings.

With reference now to the drawings, the motor stator 1 is seen to be formed from laminations 2 which are stacked horizontally and have a configuration as shown in Fig. 2, there being a cylindrical opening 3 to receive the rotor of the motor (not shown) and other openings 4 adjacent and extending through the stack of laminations parallel to the cylindrical opening 3, which receive the two pairs of short-circuit windings 5. In accordance with the invention, the wire which is round in cross-section in the illustrated embodiment although it can have other cross-sectional configurations, is fitted into the openings 4 in the stator, being bent to the proper loop form as depicted in Fig. 1, and the end portions 6, 7 of each winding are arranged parallel and close together and preferably touch one another, and with their front surfaces in a common plane.

The ends of each winding are then welded together to close the single turn which forms each short-circuit winding in accordance with any of the methods possible with the invention and which have been hereinabove described. In Figs. 1 and 2, the ends 6 and 7 of each winding are illustrated just prior to being welded.

I claim:

1. In a split-pole motor, the combination comprising a stator, and a short-circuit winding thereon, the end portions of said winding extending parallel to and preferably touching one another and with their front surfaces lying in substantially the same plane and being united by a down fusing of said end portions.

2. The method of applying a short-circuit winding to the stator of a split-pole motor which comprises the steps of arranging said winding on said stator, the end portions of said winding being arranged parallel and close together and preferably touching each other and with their front surfaces lying in substantially the same plane, and thereafter uniting said end portions by down fusing the same.

3. The method as defined in claim 2 wherein the end portions of said winding are down fused by carbon arc welding.

4. The method as defined in claim 2 wherein the end portions of said winding are down fused by resistance-fusion welding.

5. The method as defined in claim 2 wherein the end portions of said winding are down fused by pressure-butt welding.

References Cited in the file of this patent

UNITED STATES PATENTS

| | | |
|---|---|---|
| 1,276,856 | Apple | Aug. 27, 1918 |
| 1,610,506 | Fletcher | Dec. 14, 1926 |
| 1,752,023 | Packard | Mar. 25, 1930 |
| 2,251,673 | Gillen | Aug. 5, 1941 |

FOREIGN PATENTS

| | | |
|---|---|---|
| 593,681 | Germany | Mar. 1, 1934 |